US006698527B1

(12) United States Patent
White et al.

(10) Patent No.: US 6,698,527 B1
(45) Date of Patent: Mar. 2, 2004

(54) UNIVERSAL TRACTOR HITCH FOR PREVENTING LATERAL MOVEMENT OF IMPLEMENTS

(76) Inventors: Thomas B. White, 491 N. Main St., Southampton, NY (US) 11968; Bruce A. Peterson, 19 Parkside Ave., Southampton, NY (US) 11968

( * ) Notice: Subject to any disclaimer, the term of this patent is extended or adjusted under 35 U.S.C. 154(b) by 0 days.

(21) Appl. No.: 09/552,080

(22) Filed: Apr. 19, 2000

(51) Int. Cl.[7] ............................................. A01B 59/043
(52) U.S. Cl. ................................... 172/450; 230/455.1
(58) Field of Search ................................ 172/439, 443, 172/450, 677, 679; 280/455.1, 460.1, 461.1

(56) References Cited

U.S. PATENT DOCUMENTS

| 2,531,768 A | * | 11/1950 | Cline et al. ............... 280/33.44 |
| 2,653,825 A | * | 9/1953 | Collins .................... 280/33.44 |
| 2,796,818 A | * | 6/1957 | Tanke et al. ............... 97/47.65 |
| 3,056,458 A | * | 10/1962 | Gray ........................ 172/448 |
| 3,097,864 A | * | 7/1963 | Snuggins ................... 280/474 |
| 3,716,253 A | * | 2/1973 | Gniffke et al. .......... 280/415 A |
| 4,214,636 A | * | 7/1980 | Griffith ..................... 172/450 |
| 4,625,989 A | | 12/1986 | Allen et al. |
| 4,867,607 A | | 9/1989 | Johnson et al. |
| 4,892,158 A | * | 1/1990 | Brown et al. ............... 172/443 |
| 5,084,991 A | | 2/1992 | Cronk, Jr. |
| 5,178,505 A | * | 1/1993 | Smith ....................... 414/24.5 |
| 5,190,409 A | | 3/1993 | Hall |
| RE34,289 E | | 6/1993 | McClain et al. |
| 5,224,797 A | | 7/1993 | Vaughan |
| 5,267,747 A | * | 12/1993 | Thorn ....................... 280/416.2 |
| 5,538,088 A | * | 7/1996 | Wait ......................... 172/439 |
| 5,975,804 A | | 11/1999 | Bockman |
| 6,199,638 B1 | * | 3/2001 | Bentley ..................... 172/450 |

* cited by examiner

Primary Examiner—Victor Batson
(74) Attorney, Agent, or Firm—Thomas A. O'Rourke; Bodner & O'Rourke (57) ABSTRACT

The present invention is directed to an apparatus for connecting a device or implement to a tractor wherein the tractor is equipped with a conventional three-point hitch. The apparatus includes a frame having a top member and a bottom member, which are joined together by a pair of side members. Each side member is adapted to be pivotably connected to a hydraulic lift arm of a tractor and the top member is adapted to be pivotably connected to a top arm of a tractor. Each of said side members further adapted to be pivotably connected to a stabilizer bar. The stabilizer bar is adapted to be pivotably connected to said tractor. The stabilizer bars prevent lateral movement and upward movement of the frame when the frame is connected to a tractor.

19 Claims, 7 Drawing Sheets

UNIVERSAL TRACTOR HITCH FOR PREVENTING LATERAL MOVEMENT OF IMPLEMENTS

This invention relates to improvements in apparatus and methods for performing a variety of soil subsurface conditioning treatments and related activities including but not limited to trenching and cable laying. In our U.S. Pat. No. 5,756,966, the disclosures of which are incorporated herein by reference, there is described an improved sub-surface trenching and backfill apparatus. The apparatus disclosed therein comprises, inter alia, a self-propelled prime mover to which various implements may be connected including, but not limited to, a soil sub-surface trenching apparatus for subsurface delivery of a ribbon deposit of aggregate material. The prime mover is adapted to supportably mount an aggregate feed hopper and a centerless auger assembly of the apparatus. The prime mover is further equipped with a vibratory drive attachment that is adapted to connectably support and operationally position the vibratory trenching blade and trenching blade-trailing aggregate feed chute of the apparatus.

In a typical operation the self-propelled prime mover with the vibratory drive attachment held in a transport position by extension of the vibratory drive attachment lift cylinder is moved to and located for operational soil insert of the vibratory trenching blade with trenching blade-trailing aggregate feed chute. The hydraulic vibrator motor is activated to impart a variable high frequency impulse within a range of from 0 up to 2,400 cycles per minute and higher to the trenching blade while at the same time retracting the lift cylinder and imparting forward driven displacement to the prime mover, all which effects mechanical soil insertion of the blade and trench vane to the set operational depth for trench forming and backfilling. Upon activation of the centerless auger assembly there is effected conveyancing of aggregate material from the feed hopper to the feed chute for trench vane dispensing of aggregate material in backfilling of the trench and progressive formation of the soil sub-surface aggregate filled surface water drainage channel.

The apparatus of our prior patent has achieved considerable success in operation and has relieved many properties of excess moisture without the expense and difficulty of prior art French drains and related methods. In addition, the apparatus of our prior patent has been useful in creating root barriers for trees and other uses. Many golf courses, parks and other areas have a need for a soil sub-surface trenching apparatus for subsurface delivery of a ribbon deposit of aggregate material. However, many of these locations have limited budgets for the purchase of equipment. To have a specialized motive source for pulling the trenching apparatus is not practical. However, most of these locations have one or more tractors present to attend to their various landscaping needs. These tractors are a prime source for the motive power to pull the trenching apparatus of our earlier invention.

When the prime mover is in the form of a conventional tractor, however, difficulties have been encountered in performing the aforementioned vibratory trenching. Conventional tractors employ three-point hitches that correspond to connections on a variety of farm and landscaping attachments. In attaching implements to a conventional tractor having the three-point hitches requires a significant degree of effort. Not infrequently, there is a fair amount of back and forth movement of the tractor to achieve the necessary precise alignment of the lower connections on the hydraulic lift arms with the corresponding connections on the implement. The upper connection is similarly difficult to make. One of the major problems that have been encountered in using conventional tractors with a vibratory trenching apparatus is the problem of lateral sway and vertical movement. The hydraulic lift arms on a conventional tractor can but usually do not provide sufficient downward pressure on an attachment to keep it in place on the ground and most rely upon their inherent weight and/or suction to keep the implement in the ground. However, there is usually considerable lateral sway in the hydraulic lift arms on alignment when an attachment is to be connected to a conventional tractor. While some of this sway is counteracted by the presence of lateral stabilizer bars, there is still considerable sway in the attachment. While the presence of sway is not necessarily a significant problem in most tractor applications such as plowing, cultivating etc., it presents a significant problem when a vibratory drive attachment is being used with the tractor three-point hitches. Because of strong vibrations of the vibratory drive member when it encounters various soil conditions (impervious, compacted, etc.), the swaying of the lift arms and upper connection cause the vibratory drive member to meander from the line of travel as well as causing the vibratory drive member to become lifted from below the surface of the soil. This causes gaps in the trench and reduces the drainage or other desired properties of the trench thus decreasing the effectiveness of the treatment. Similar problems with lateral sway are also encountered in the use of other devices, such as for example a stump grinder where the side to side movement permitted by the conventional three-point hitches on tractors causes the stump grinder to move off the desired grinding location during operation.

There are prior art devices using vibratory mechanisms with a three-point hitch on conventional tractors. In Re U.S. Pat. No. 34,289 to McCain, there is disclosed an angularly adjustable vibratory trench filling attachment assembled by means of a three-point hitch to the side of a tracked vehicle. There is no teaching in McCain of a vibratory drive member that inserts a blade into the soil to form a trench or any of the issues relating to swaying. McCain in fact is primarily a sifter to sift dirt without rocks and stones into a trench and as a result, swaying is not an issue in this patent. In U.S. Pat. No. 4,625,989 to Allen there is disclosed a tractor/implement hitch that provides a draw bar pickup type hitch which is used in conjunction with a conventional three-point hitch.

There are a number of prior art hitches for tractors that are known in the art. For example, U.S. Pat. No. 4,069,885 discloses a hitch having three-point attachment of an inverted V shaped frame for lifting by a tractor into a recess of an inverted V shape in a connecting device carried by an implement. No provision for use with a vibratory drive attachment is disclosed. U.S. Pat. No. 4,509,768 discloses a tractor hitch utilizing a horizontal transverse pin carried between cheek plates which gradually straddle a downwardly tapering triangular leg depending from a horizontal leg which extends outwardly from the top of a vertical mounting plate on an implement. After upward movement of the pin and cheek plates, the base of the triangular leg, which is slightly shorter than the distance between the cheek plates, is confined between the cheek plates and beneath the hook formed by the downwardly extending triangular leg and is approximately centered with respect to the axes of the vehicle. There is also no disclosure of vibratory drive attachment or the problems associated with such devices.

The prior art is further exemplified by U.S. Pat. Nos. 4,015,85 and 4,431,207 both of which illustrate apparatus for securing agricultural implements to tractors utilizing three-point hitches. The object of both patents is to provide apparatus for engaging and disengaging an implement or tow vehicle wherein the operator does not have to leave the tractor. The apparatus of both of these patents relies upon engagement of a tongue of the implement between members presenting aligned holes for receiving a vertical hitch pin actuated by a fluid operated cylinder. The alignment problems presented by these patented apparatus appear to be nearly as great as those presented by conventional hitches. The prior art is further illustrated by U.S. Pat. Nos. 4,867,607, 5,084,991, 5,190,409, 5,224,797, 5,975,804, 2,635,890, 2,822,739, 2,983,523, 3,716,253, 3,956,331, 3,889,979 and 3,951,435.

SUMMARY OF THE INVENTION

The principal object of the present invention is to provide a stationary platform to mount various surface and subsurface apparatus including but not limited to trenching, vibratory plowing and a soil sub-surface trenching apparatus for subsurface delivery of a ribbon deposit of aggregate material that may be used in conjunction with a conventional tractor having a three-point hitch.

It is another object of the present invention to provide a hitch that eliminates swaying on a conventional tractor having a three-piece hitch so that there is a stable platform to mount various surface and subsurface apparatus including but not limited to trenching, vibratory plowing, and a soil sub-surface trenching apparatus for subsurface delivery of a ribbon deposit of aggregate material which may be propelled by a conventional tractor.

It is also an object of the present invention to provide a hitch for connecting apparatus such as a trencher, a stump grinder and other devices to a conventional tractor where lateral sway of the apparatus is minimized during operation.

The present invention is directed to an apparatus for connecting a device or implement to a tractor wherein the tractor is equipped with a conventional three-point hitch. The apparatus includes a frame having a top member and a bottom member, which are joined together by a pair of side members. Each side member is adapted to be pivotably connected to a hydraulic lift arm of a tractor and the top member is adapted to be pivotably connected to a top arm of a tractor. Each of said side members further adapted to be pivotably connected to a stabilizer bar. The stabilizer bar is adapted to be pivotably connected to said tractor. The stabilizer bars prevent lateral movement and upward movement of the frame when the frame is connected to a tractor.

BRIEF DESCRIPTION OF THE DRAWINGS

The construction designed to carry out the invention will be hereinafter described, together with other features thereof The invention will be more readily understood from a reading of the following specification and by reference to the accompanying drawings forming a part thereof, wherein an example of the invention is shown and wherein.

DETAILED DESCRIPTION OF THE DRAWINGS

The tractor 10 has hydraulic lift arms 11 and 12 at pivotal connecting points for a standard three-point hitch. The apparatus or hitch 13 of the present invention is capable of being mounted on the three-point hitch of the conventional tractor. The top bar 14 forms the third arm of the three-point hitch for the tractor. The hitch 13 of the present invention is typically comprised of a frame having atop member 15 and a bottom member 16. The top and bottom member 15 and 16 are joined together by a pair of side members 17 and 18. Although the figure depicts a generally rectangular configuration, any shape for the hitch may be suitable. For example the hitch may be generally circular or have the shape of any other polygon such as a pentagon or a trapezoid. Each member may be made of a solid material or may be tubular in cross section. In addition, the frame may comprise a single member. Where the frame is not generally rectangular in configuration as shown in the drawings, the top member is defined as that region in the upper portion of said frame, the bottom member is defined as that region in the lower portion of said frame and the side members are defined as that region of the frame on the sides thereof. The members usually have a front surface 19, a rear surface 20, an exterior surface 21 and an interior surface 22. Although the cross section of the members in the Figures is also generally rectangular, the cross section may be of any design so long as it provides the required rigidity and strength.

The hitch of the present invention may have shafts 23 and 24 toward the lower portion 25 of the side members 17 and 18. Alternatively, instead of employing shafts, there may be a flange or more preferably a pair of flanges extending from the hitch toward the tractor from each of the side members. These flanges would be provided with at least one orifice to receive a pin. A pin 26 is illustrated at a central upper location on the hitch providing a pivotal connection to the top bar 14 of a standard three-point hitch. The shafts 23 and 24 are pivotally secured in end bearings 27 and 28 of respective hydraulic lift arms 11 and 12. It will be observed that the respective shafts 23 and 24 are retained within the respective end bearing members 27 and 28 by suitable fasteners such as quick disconnect pins 29 and 30. The pin 31 is illustrated as received in an end bearing 32 of the top bar 14. The top bar 14 is connected on the other end by a suitable pin 26 to a bracket 34 carried by the tractor. The pin 31 may be suitably fastened within a bracket carried by the hitch by a quick disconnect pin 36, for completing the upper pivotal three-point connection. In a preferred embodiment of the invention, the hitch may have a pair of brackets, i.e., upper left three-point hitch center link flange 33 and upper right three-point hitch center link flange 35 to which the top bar 14 may be connected by a suitable means such as disconnect pin 31. The lift arms 11 and 12 each have suitable connection to a standard sway bar 37 and a lost motion coupling 38. The lost motion coupling is pivotally connected as at 39 to a hydraulically operated link 40 which is powered by suitable hydraulic means on the tractor to exert a lifting action by a counterclockwise movement. The lift arms 11 and 12 may be pivotally connected to the tractor.

With the traditional three-point hitch on a tractor it has been found that a soil sub-surface trenching apparatus vibrates too much and causes side to side or transverse motion. In addition, there is a need for the trenching apparatus or other implement on the tractor to remain in the ground even when compacted soil or other condition is reached. The hydraulic lift arms 11 and 12 on a conventional tractor as well as the top bar 14 have typically too much side to side movement to prevent a soil sub-surface trenching apparatus from traveling in a side to side direction as it is being pulled by the tractor. In addition, these arms also do not provide the necessary pressure to retain an implement in the soil. Many implements attempt to rectify the inability of the arms and the top bar to retain an implement in the soil by designing the implement so that the design of the implement is such that it is pulled into the ground as the tractor is moved forward.

In order to solve the problem of swaying in a side to side direction as well as to provide a hitch that retains the implement in the soil, it has been found that by providing first and second stabilizer bars 41 and 42 in addition to the lift arms 11 and 12 and the top bar 14 the hitch is stabilized and side to side motion is eliminated from the hitch. The first and second stabilizer bars 41 and 42 are connected on one end by a suitable pin 43 to a bracket 44 carried by the tractor. The stabilizer bars 41 and 42 are connected on the opposite end to the hitch by any suitable means such as a pin 45 that passes through brackets or flanges located on the hitch. The stabilizer bars 41 and 42 are preferably adjustable so that they may be lengthened or shortened so that the hitch may be adjusted so that it is generally perpendicular to the surface of the ground.

The left outside adjustable stabilizer link flange 46 and left inside adjustable stabilizer link flange 47 connect stabilizer bar 41 to the hitch. The right outside adjustable stabilizer link flange 48 and right inside adjustable stabilizer link flange 49 connect stabilizer bar 42 to the hitch. The flanges 46 to 49 are preferably adjustable so that their location along the side members can vary based on the type of attachment being connected to the hitch. Preferably the flanges are located in the lower region 50 and 51 of the hitch. In addition, the brackets 46 to 49 are preferably oriented toward the front surface 19 of the members. In an alternative embodiment the stabilizer bars may be connected to the hitch by a pin or other suitable connecting means that passes through an orifice in the end of the stabilizer bar as well as an orifice that passes directly through the side members 17 and 18 thus eliminating the need for the flanges. The side members may be provided with a plurality of orifices at various locations along the sides of the side members so that the height of the stabilizer bars may be adjusted.

Figure 1:
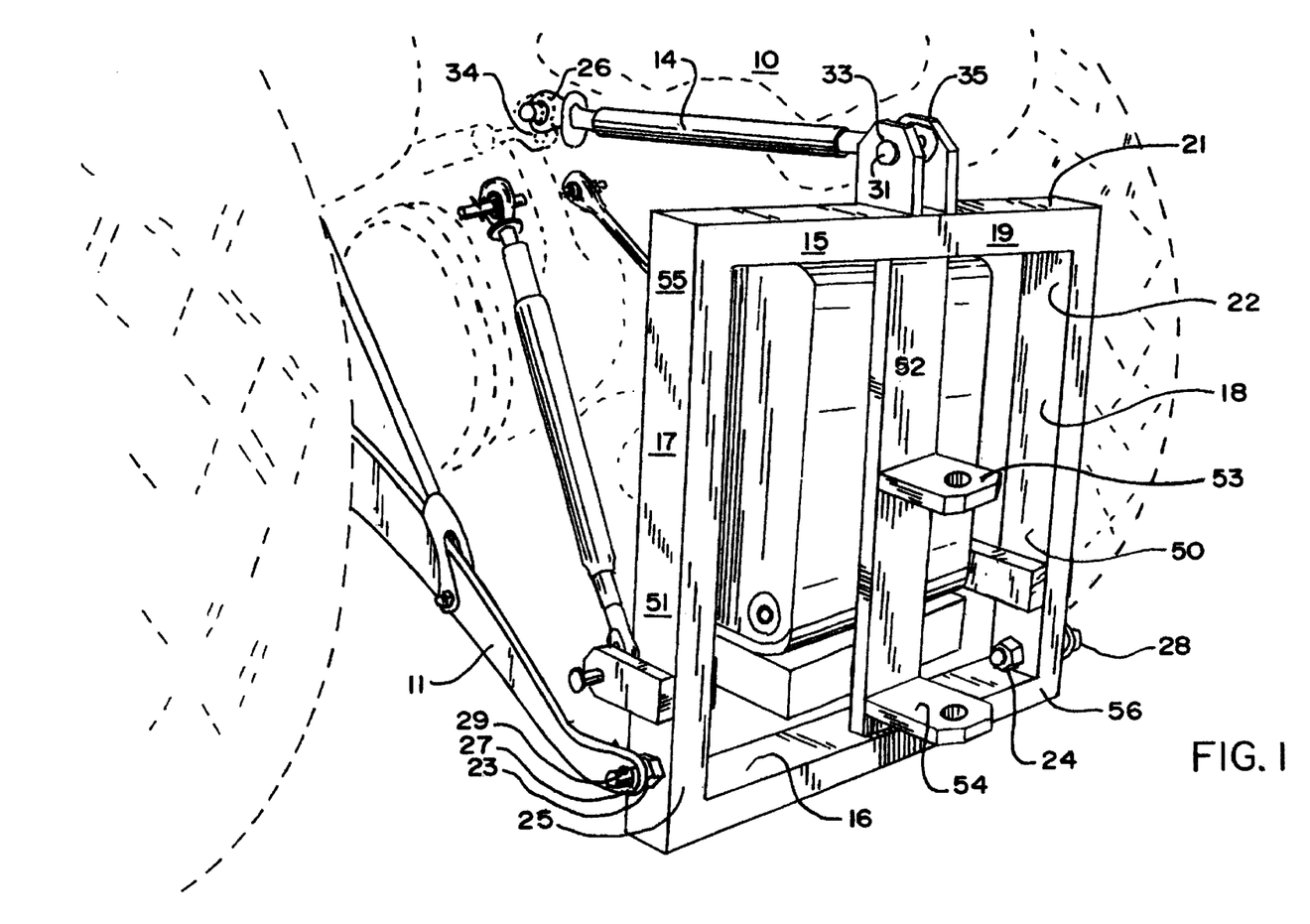
FIG. 1 is a rear perspective view illustrating a tractor equipped with a conventional three-point hitch with the hitch of the present invention.
Figure 2:
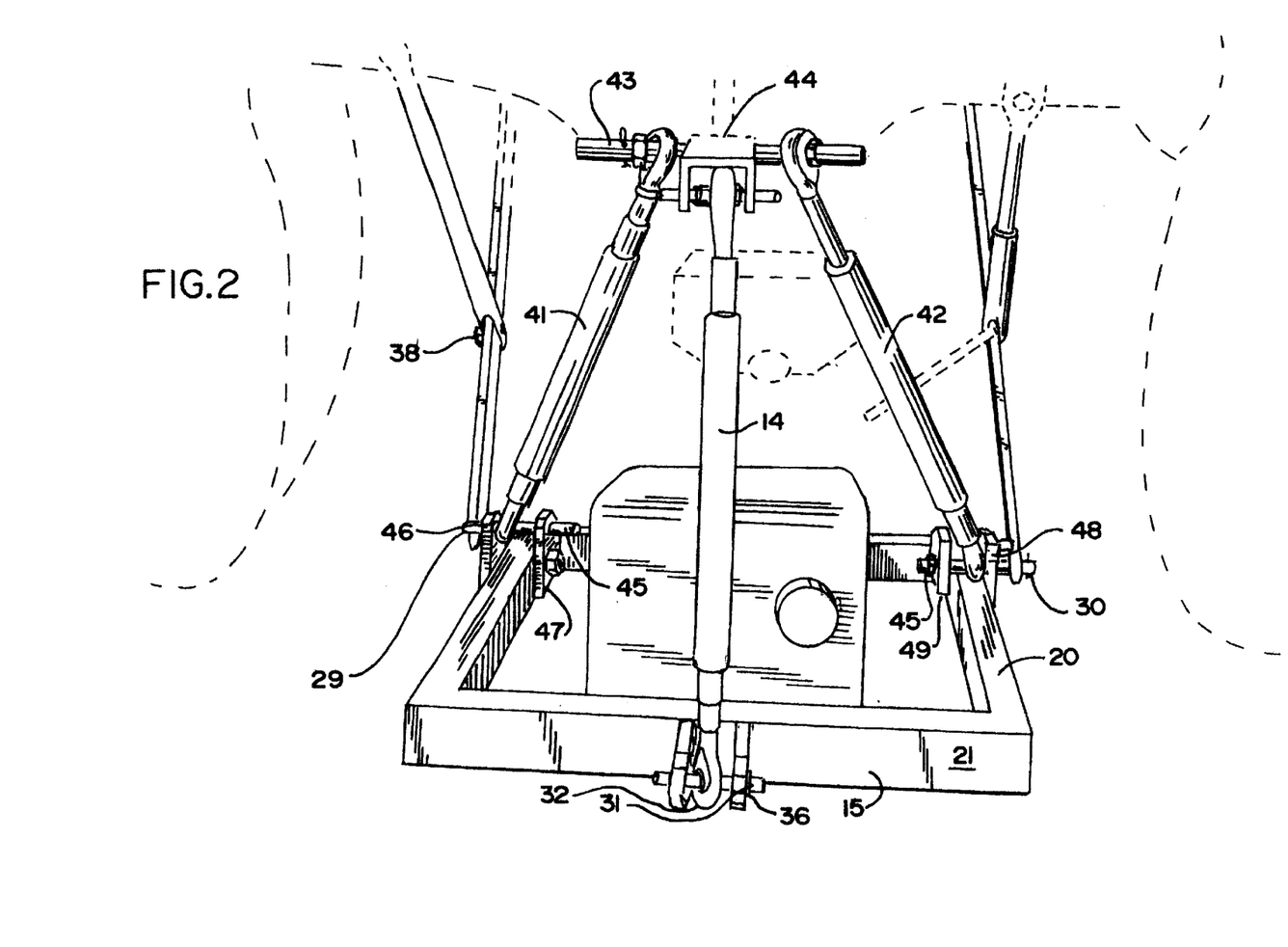
FIG. 2 is a top view looking downwardly at the rear of the tractor showing the hitch of the present invention mounted on a tractor.
Figure 3:
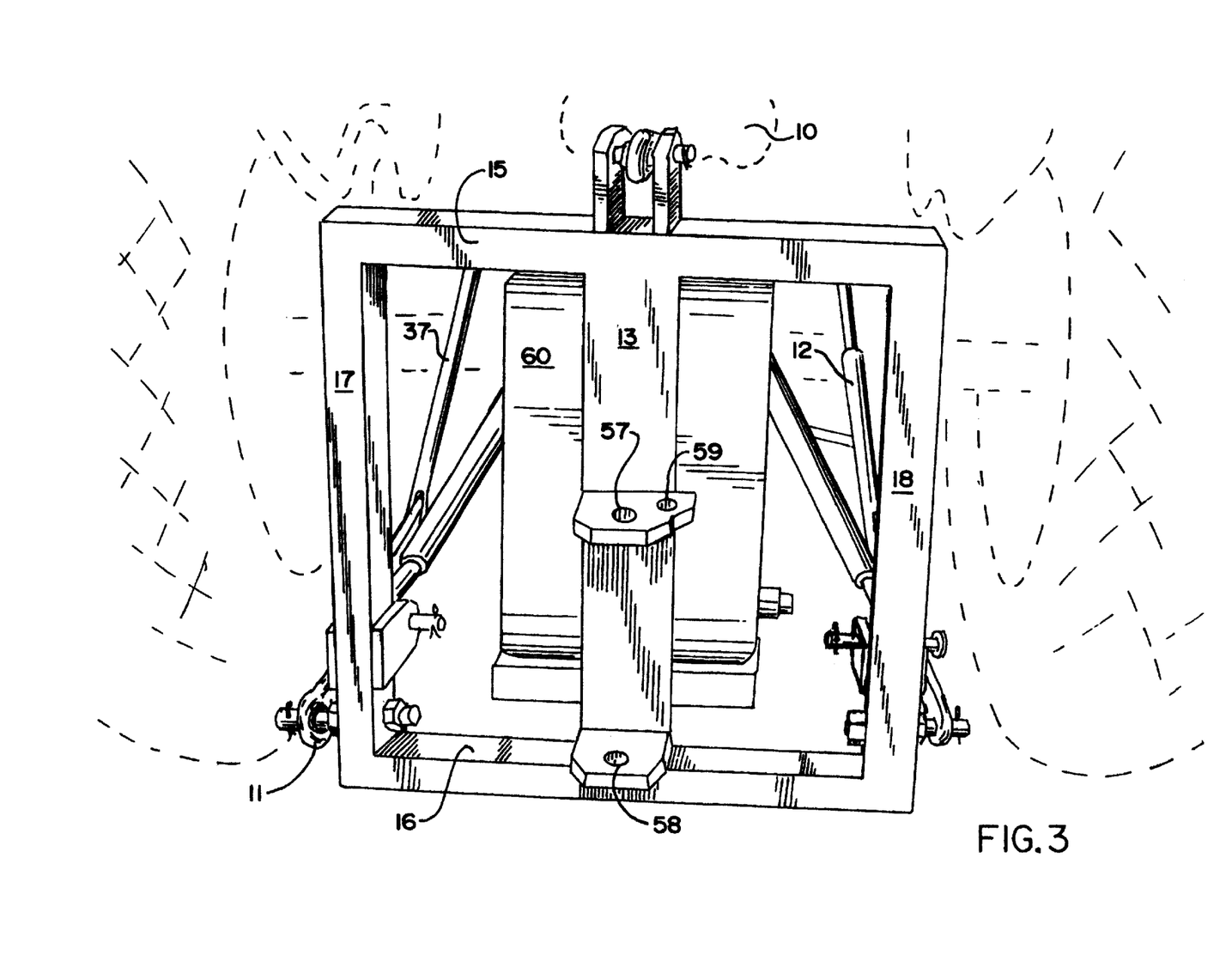
FIG. 3 is a rear view of the hitch of the present invention mounted on a tractor.
Figure 4:
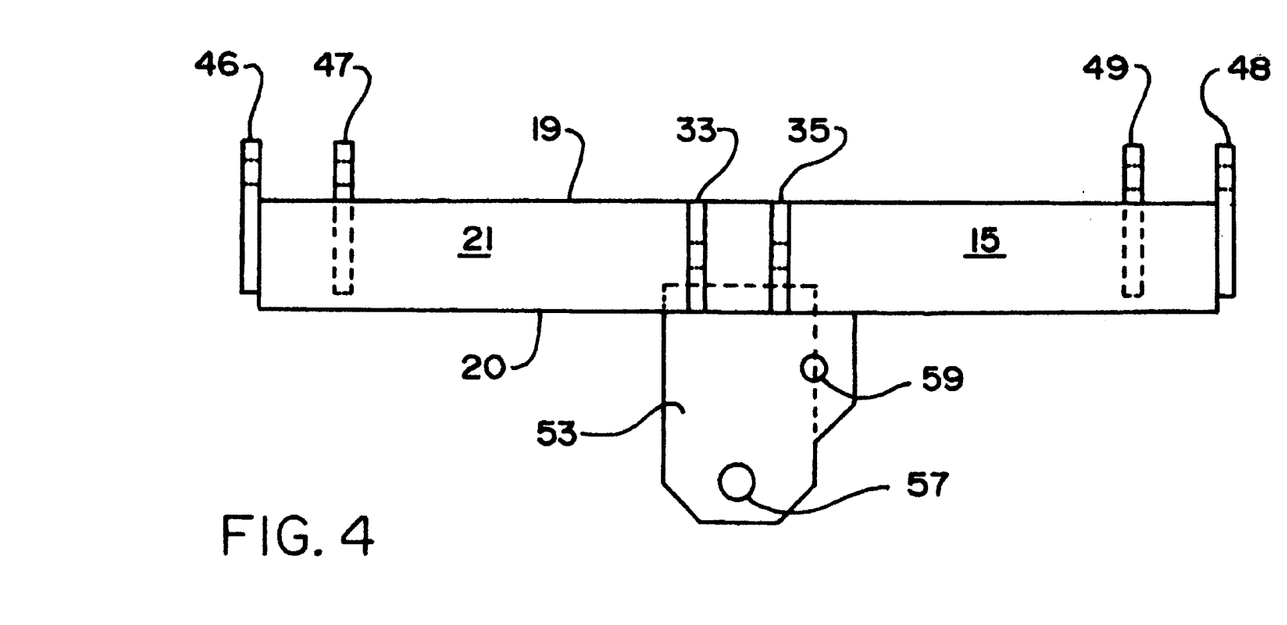
FIG. 4 is a top view of the hitch of the present invention.
Figure 5:
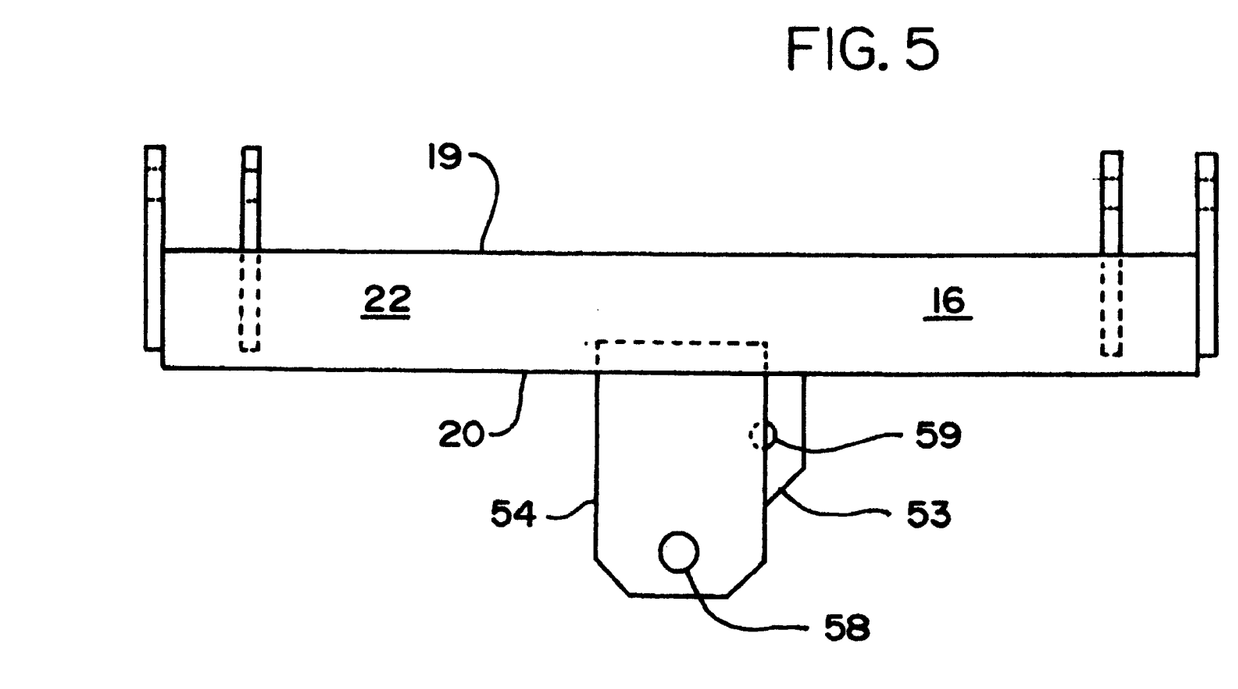
FIG. 5 is a bottom view of the hitch of the present invention.
Figure 6:
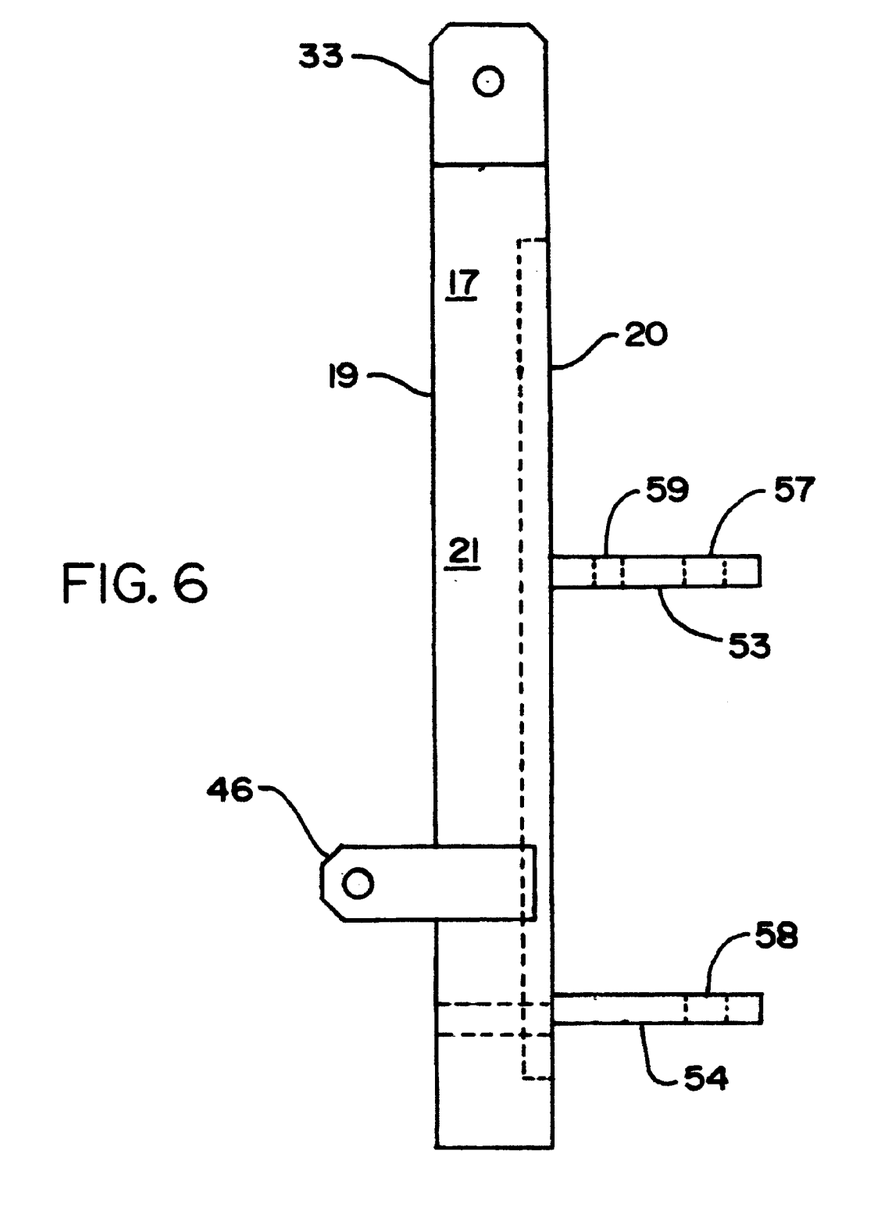
FIG. 6 is a left side view of the hitch of the present invention.
Figure 7:
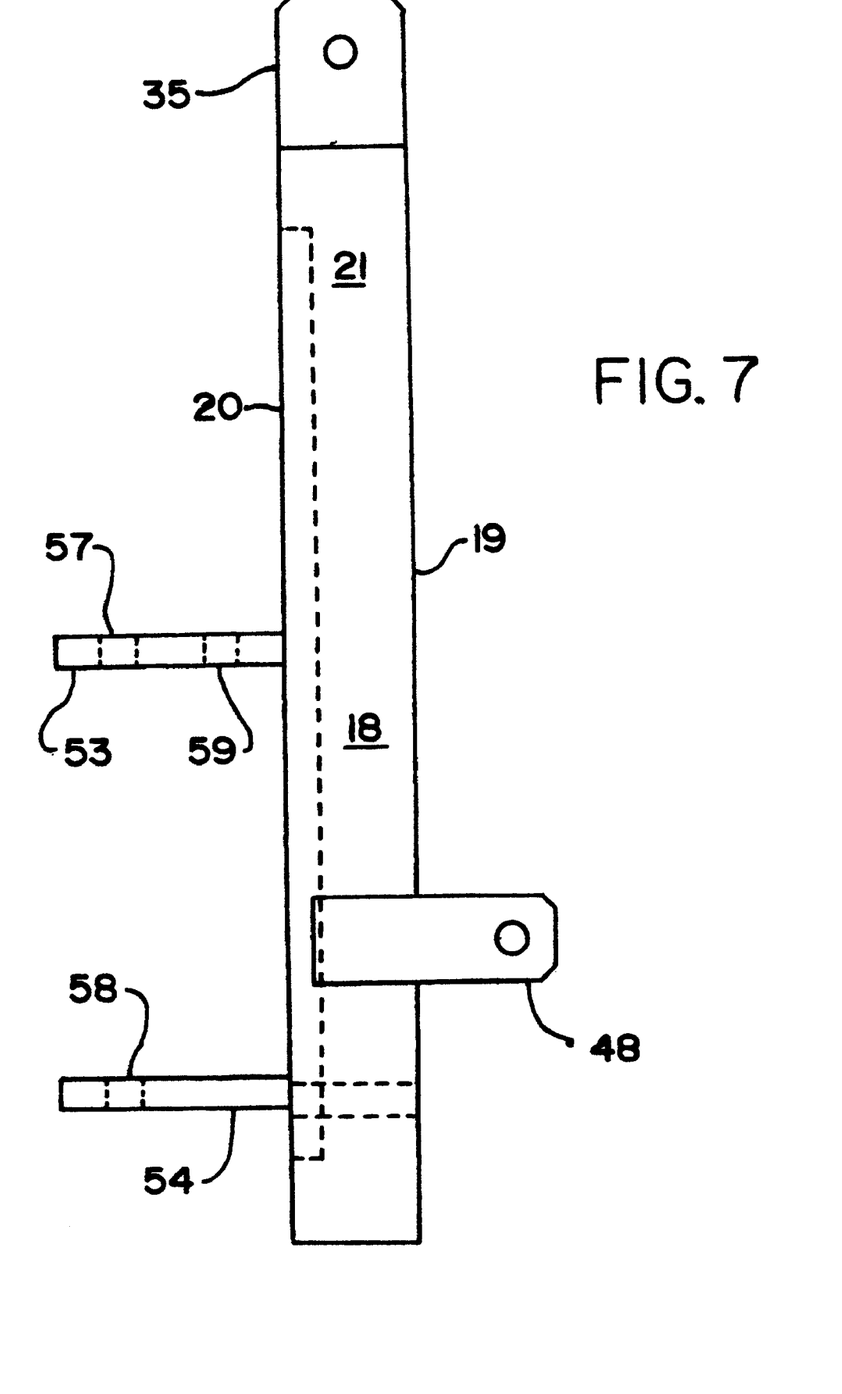
FIG. 7 is a right side view of the hitch of the present invention.

The hitch may be provided with a center bar 52 that extends from one member to the opposite member. As shown in FIG. 1 the center bar 52 extends from the top member 15 to the bottom member 16 in a generally vertical manner. The purpose of the center bar 52 is to provide increased stability to the hitch as well as provide a location for upper vibratory plow hinge flange 53 and lower vibratory plow hinge flange 54 which are used to mount the soil sub-surface trenching apparatus, pipe laying equipment or other suitable apparatus to the hitch. The flanges 53 and 54 may be adjustable along the center bar 52. In one embodiment of the invention the center bar may be provided with a plurality of orifices through which pins on the rear of the flanges may pass to hold the flange to the center bar.

It will be appreciated by those skilled in the art that the center bar 52 could also extend from side member 17 to side member 18 and be in a generally horizontal orientation. In addition, the side member can also be on a diagonal extending from upper left corner 55 to lower right corner 56.

Brackets or flanges 53 and 54 are preferably provided with a vibratory plow hinge pin hole 57 and 58 respectively for receiving a pin (not shown) to connect the trenching or other apparatus to the hitch. Bracket 53 may also be provided with a vibratory plow hinge locking pin hole 59. In a preferred embodiment the hitch of the present invention is provided with a reservoir 60 for containing a lubricant that is applied to the apparatus mounted on the hitch. In an alternative embodiment the lubricant may be contained in the members, if one or more of the members have a hollowed out portion for holding the lubricant. If the hitch itself is the reservoir for the lubricating medium and/or hydraulic fluid then the members are typically provided with larger dimensions. As shown in the Figures, the members are preferably about 1–3" in thickness and about 2–5" wide. If the members themselves are to be the reservoir then the thickness can be preferably 2–6" in thickness and about 4–12" wide. Naturally, it will be appreciated by those skilled in the art that these dimensions are approximate and can be varied depending on the amount of lubrication fluid desired.

We claim:

1. An apparatus for connecting a device to a tractor having a three-point hitch comprising a frame having a top member and a bottom member, said top and bottom member being joined together by a pair of side members, each side member being adapted to be pivotably connected to a hydraulic lift arm of a tractor, said top member being adapted to be pivotably connected to a top arm of a tractor, each of said side members being adapted to be pivotably connected to a stabilizer bar, said stabilizer bar being adapted to be pivotably connected to said tractor, said stabilizer bars preventing lateral movement and upward movement of said frame when said frame is connected to a tractor.

2. The apparatus according to claim 1 wherein a center bar is connected to said frame.

3. An apparatus for connecting a device to a tractor having a three-point hitch comprising a frame having a top member and a bottom member, said top and bottom member being joined together by a pair of side members, each side member being adapted to be pivotably connected to a hydraulic lift arm of a tractor, said top member being adapted to be pivotably connected to a top arm of a tractor, each of said side members being adapted to be pivotably connected to a stabilizer bar, said stabilizer bar being adapted to be pivotably connected to said tractor, said stabilizer bars preventing lateral movement and upward movement of said frame when said frame is connected to a tractor, said frame further comprising a center bar connected to said frame wherein said center bar has a means for connecting a device to said tractor.

4. The apparatus according to claim 3 wherein the side members are provided with at least one shaft for receiving a pin for connecting said frame to said hydraulic lift arms of a tractor.

5. The apparatus according to claim 4 wherein each of said side members is provided with at least one flange extending therefrom for pivotably connecting said stabilizer bars to said frame.

6. The apparatus according to claim 5 wherein said center bar extends from said top member to said bottom member.

7. The apparatus according to claim 6 wherein said frame is provided with a reservoir for a lubricant.

8. The apparatus according to claim 7 wherein said reservoir is within at least one member of the frame.

9. The apparatus according to claim 8 wherein said reservoir is within all members of the frame.

10. A tractor with a three point hitch having an accessory connected to said hitch by means of a frame having a top member and a bottom member, said top and bottom member being joined together by a pair of side members, each side member being pivotably connected to a hydraulic lift arm of a tractor, said top member being pivotably connected to a top arm of a tractor, each of said side members being pivotably connected to a stabilizer bar, said stabilizer bar being pivotably connected to said tractor whereby said stabilizer bars prevent lateral movement and upward movement of the frame.

11. The apparatus according to claim 10 wherein a center bar is connected to said frame.

12. The apparatus according to claim 11 wherein said center bar has a means for connecting a device to said tractor.

13. The apparatus according to claim 10 wherein the side members are provided with at least one shaft for receiving a pin for connecting said frame to said hydraulic lift arms of a tractor.

14. The apparatus according to claim 13 wherein each side member is provided with at least one flange extending therefrom for pivotably connecting said stabilizer bars to said frame.

15. The apparatus according to claim 14 wherein said center bar extends from said top member to said bottom member.

16. The apparatus according to claim 15 wherein said frame is provided with a reservoir for a lubricant.

17. The apparatus according to claim 16 wherein said reservoir is within at least one member of the frame.

18. The apparatus according to claim 17 wherein said reservoir is within all members of the frame.

19. A method of connecting a device to a tractor having a three-point hitch comprising pivotably connecting to a hydraulic lift arm of a tractor, a frame having a top member and a bottom member, said top and bottom member being joined together by a pair of side members, pivotably connecting said top member to a top arm of a tractor, pivotably connecting each of said side members to a stabilizer bar, said stabilizer bar being pivotably connected to said tractor whereby said stabilizer bars prevent lateral movement and upward movement of the frame.

* * * * *